US011218500B2

(12) United States Patent
Soeder et al.

(10) Patent No.: US 11,218,500 B2
(45) Date of Patent: Jan. 4, 2022

(54) METHODS AND SYSTEMS FOR AUTOMATED PARSING AND IDENTIFICATION OF TEXTUAL DATA

(71) Applicant: Secureworks Corp., Wilmington, DE (US)

(72) Inventors: Kyle Soeder, Chesapeake, VA (US); Harlan Parrott, The Colony, TX (US); Paul DiOrio, Wilmington, DE (US); Bradley Skaggs, Wilmington, DE (US)

(73) Assignee: Secureworks Corp., Wilmington, DE (US)

( * ) Notice: Subject to any disclaimer, the term of this patent is extended or adjusted under 35 U.S.C. 154(b) by 356 days.

(21) Appl. No.: 16/527,353

(22) Filed: Jul. 31, 2019

(65) Prior Publication Data

US 2021/0037032 A1 Feb. 4, 2021

(51) Int. Cl.
*H04L 9/00* (2006.01)
*H04L 29/06* (2006.01)
*G06N 3/08* (2006.01)

(52) U.S. Cl.
CPC .......... *H04L 63/1425* (2013.01); *G06N 3/08* (2013.01); *H04L 63/20* (2013.01)

(58) Field of Classification Search
CPC ....... H04L 63/1425; H04L 63/20; G06N 3/08; G06N 3/0445; G06N 7/005; G06N 3/0454
See application file for complete search history.

(56) References Cited

U.S. PATENT DOCUMENTS 6,115,686 A 9/2000 Chung et al.
7,653,633 B2 1/2010 Villella et al.
(Continued)

FOREIGN PATENT DOCUMENTS

CN 105005549 A 10/2015

OTHER PUBLICATIONS

GitHub; *A toolkit for making domain-specific probabilistic parsers*; https://github.com/datamade/parserator; available Jan. 8, 2019.
(Continued)

*Primary Examiner* — Beemnet W Dada
(74) *Attorney, Agent, or Firm* — Womble Bond Dickinson (US) LLP

(57) ABSTRACT

A method and system for parsing and identifying security log message data, which can include receiving system generated unstructured or partially semi-structured security log data from a plurality of source systems and devices, including a variety of different source systems and/or devices. The message data is received from the various sources in the form of raw log message data, as a stream of bytes received by a parsing system that identifies and extracts character features of the incoming raw messages. The extracted character features are compiled into data structures that are evaluated by a model(s) to determine segmentation boundaries thereof and generate message tokens, which are further classified as including variable data field(s) or as a template text string. Template categorized message tokens are used to provide message fingerprint information for characterizing the overall form of the message, and for comparison to a collection of previously stored/evaluated message fingerprints by a classifier. If the message fingerprint is determined to match a stored fingerprint with or above a selected confidence level, the parsed message can be stored. Unidentified message forms/fingerprints can be routed to a labeling system for further analysis, the results of which are used to train and update the character identification and classification engines/models.

10 Claims, 7 Drawing Sheets

(56) References Cited

U.S. PATENT DOCUMENTS

| | | | |
|---|---|---|---|
| 9,122,694 B1* | 9/2015 | Dukes | G06F 16/244 |
| 9,384,112 B2 | 7/2016 | Petersen et al. | |
| 9,411,672 B1 | 8/2016 | Cooper et al. | |
| 9,483,583 B2 | 11/2016 | Braun et al. | |
| 10,599,688 B2 | 3/2020 | McLean | |
| 10,764,315 B1* | 9/2020 | Carroll | H04L 43/04 |
| 2003/0217292 A1 | 11/2003 | Steiger | |
| 2004/0193912 A1 | 9/2004 | Li | |
| 2009/0307640 A1 | 12/2009 | Chapman et al. | |
| 2011/0153667 A1 | 6/2011 | Parmenter | |
| 2011/0185055 A1 | 7/2011 | Nappier | |
| 2013/0227519 A1 | 8/2013 | Maleport | |
| 2014/0040261 A1 | 2/2014 | Horne | |
| 2014/0372105 A1 | 12/2014 | Manadhata | |
| 2015/0067839 A1 | 3/2015 | Wardman et al. | |
| 2015/0264011 A1 | 9/2015 | Liang | |
| 2015/0271047 A1 | 9/2015 | McLean | |
| 2015/0324457 A1 | 11/2015 | McLean | |
| 2016/0217522 A1 | 7/2016 | Jnagal et al. | |
| 2016/0371489 A1 | 12/2016 | Puri et al. | |
| 2017/0171228 A1 | 6/2017 | McLean | |
| 2017/0187734 A1 | 6/2017 | Lee | |
| 2017/0214701 A1 | 7/2017 | Hasan | |
| 2017/0220218 A1 | 8/2017 | Zhao et al. | |
| 2017/0220664 A1 | 8/2017 | Rulev et al. | |
| 2017/0223039 A1 | 8/2017 | Mont | |
| 2018/0018382 A1 | 6/2018 | Schneider | |
| 2018/0173812 A1 | 6/2018 | Agarwal et al. | |
| 2019/0130009 A1 | 5/2019 | McLean | |
| 2021/0200740 A1* | 7/2021 | Sterngold | G06F 11/3476 |

OTHER PUBLICATIONS

Wikipedia; *Frequent pattern discovery*; https://en.wikipedia.org/wiki/Frequent_pattern_discovery; last edited on Mar. 22, 2019.

Wikipedia; *Grammar induction*; https://en.wikipedia.org/wiki/Grammar_induction; lasted edited on Jul. 23, 2019.

Ju, Meizhi; Miwa, Makoto and Ananiadou, Sophia; *A Neural Layered Model for Nested Named Entity Recognition*; Conference Proceedings of the 2018 Conference of the North American Chapter of the Association for Computational Linguistics: Human Language Technologies; vol. 1; pp. 1446-1459, New Orleans, Louisiana, Jun. 1-6, 2018; available at https://www.aclweb.org/anthology/N18-1131 and https://www.researchgate.net/publication/325447158_A_Neural_Layered_Model_for_Nested_Named_Entity_Recognition.

Wikipedia; *Lexical analysis*: https://en.wikipedia.org/wiki/Lexical_analysis#Lexeme; last edited on Aug. 6, 2019.

Wikipedia; *Active learning*; https://en.wikipedia.org/wiki/Active_learning; lasted edited on Jul. 2, 2019.

Wikipedia; *Whitespace character*; https://en.wikipedia.org/wiki/Whitespace_character#Unicode; last edited on Aug. 13, 2019.

Ross, Stephane; Gordon, Geoffrey J; and Bagnell, J. Andrew; *A Reduction of Imitation Learning and Structured Prediction to No-Regret Online Learning*; 14th International Conference on Artificial Intelligence and Statistics (AISTATS 2011), Fort Lauderdale, FL, USA; vol. 15 of JMLR; (Cited as: arXiv:1011.0686v3 [cs.LG]); Mar. 16, 2011; available at https://arxiv.org/pdf/1011.0686.pdf.

GitHub; *awesome-log-analysis*; https://github.com/logpai/awesome-log-analysis/blob/master/papers.md#log-parsing; last updated Aug. 11, 2019.

Zhu, Jieming; He, Shilin; Liu, Jinyang; He, Pinjia; Xie, Qi; Zheng, Zibin and Lyn, Michael R.; *Tools and Benchmarks for Automated Log Parsing*; International Conference on Software Engineering (ICSE'19); (Cited as: arXiv: 1811.03509v2 [cs.SE]); Jan. 3, 2019; available at https://arxiv.org/pdf/1811.03509.pdf.

Messaoudi, Salma; Panichella, Annibale; Bianculli, Domenico; Briand, Lionel and Sasnauskas, Raimondas; *A Search-based Approach for Accurate Identification of Log Message Formats*; Proceedings of the 26th IEEE/ACM International Conference on Program Comprehension (ICPC' 18); Publisher ACM; pp. 167-177; May 27-28, 2018, Gothenburg, Sweden; available at http://publications.uni.lu/bitstream/10993/35286/1/ICPC-2018.pdf and http://orbilu.uni.lu/handle/10993/35286.

IEEE; He, Pinjia; Zhu, Jieming; He, Shilin; Li, Jian and Lyu, Michael R.; *Towards Automated Log Parsing for Large-Scale Log Data Analysis*; IEEE Transactions on Dependable and Secure Computing; vol. 15, Issue: 6; pp. 931-944; Oct. 13, 2017; available at https://ieeexplore.ieee.org/document/8067504 and https://pinjiahe.github.io/papers/TDSC17.pdf.

Hamooni, Hossein; Debnath, Bipolb; Xu, Jianwu; Zhang, Hui, Jiang, Guofei; and Mueen Abdullah; *LogMine: Fast Pattern Recognition for Log Analytics*; CIKM 2016; Oct. 24-28, 2016, Indianapolis, IN USA; available at https://www.cs.unm.edu/~mueen/Papers/LogMine.pdf.

Du, Min and Li, Feifei; *Spell: Streaming Parsing of System Event Logs*; 2016 IEEE 16th International Conference on Data Mining (ICDM), Dec. 12-15, 2016, Barcelona, Spain; Publisher: ieee; available at https://ieeexplore.IEEE.org/document/7837916 and https://www.cs.utah.edu/~lifeifei/papers/spell.pdf.

He, Pinjia; Zhu, Jieming; Zheng, Zibin and Lyu, Michael R.; *Drain: An Online Log Parsing Approach with Fixed Depth Tree*; 2017 IEEE International Conference on Web Services (ICWS), Jun. 25-30, 2017, Honolulu, HI, USA; Publisher: IEEE; available at https://ieeexplore.ieee.org/document/8029742 and https://www.bing.com/search?q=drain%3A+An+Online+Log+Parsing+Approach+with+Fixed+Depth+Tree&src=IE-SearchBox&FORM=IESR3N.

He, Pinjia; Zhu, Jieming; He, Shilin; and Lyn, Michael R. *An Evaluation Study on Log Parsing and Its Use in Log Mining*; 2016 46th Annual IEEE/IFIP International Conference on Dependable Systems and Networks (DSN), Jun. 28-Jul. 1, 2016; Toulouse, France; Publisher: IEEE; available at https://ieeexplore.ieee.org/document/7579781 and https://pinjiahe.github.io/papers/DSN16.pdf.

Makanju, Adetokunbo, A. Nur Zincir-Heywood and Milios, Evangelos E.; *A Lightweight Algorithm for Message Type Extraction in System Application Logs*; IEEE Transactions on Knowledge and Data Engineering; vol. 24, Issue: 11; pp. 1921-1936; Publisher: IEEE; Jun. 30, 2011; available at https://ieeexplore.ieee.org/document/5936060 and https://web.cs.dal.ca/~makanju/publications/paper/tkde11.pdf.

Tang, Liang; Li, Tao and Perng, Chang-Shing; *LogSig: Generating System Events from Raw Textual Logs*; Conference Proceedings of the 20th ACM Conference on Information and Knowledge Management, CIKM 2011, Oct. 24-28, 2011; Glasgow, United Kingdom; available at http://users.cis.fiu.edu/~lpeng/log/2_LogSig-%20Generating%20system%20events%20from%20raw%20textual%20logs.pdf and https://www.researchgate.net/publication/221615397_LogSig_Generating_system_events_from_raw_textual_logs.

Makanju, Adetokunbo; A. Nur Zincir-Heywood and Milios, Evangelos; *Clustering Event Logs Using Iterative Partitioning*; Proceedings of the 15th ACM SIGKDD International Conference on Knowledge Discovery and Data Mining; pp. 1255-1264; Jun. 28-Jul. 1, 2009, Paris, France; available at https://web.cs.dal.ca/~makanju/publications/paper/kdd09.pdf and https://dl.acm.org/citation.cfm?id=1557154.

Fu, Qiang; Lou, Jian-Guang; Wang, Yi and Li, Jiang; *Execution Anomaly Detection in Distributed Systems through Unstructured Log Analysis*; Microsoft Research Asia, Beijing, P.R. China and Dept. of Computer Science & Technology, Beijing University of Posts and Telecommunications, Beijing, P.R. China; ICDM Conference 2009, The Ninth IEEE International Conference on Data Mining; Miami, Florida, USA; Dec. 6-9, 2009; available at https://www.researchgate.net/publication/220765301_Execution_Anomaly_Detection_in_Distributed_Systems_through_Unstructured_Log_Analysis.

Lin, Hao; Zhou, Jingyu; Yao, Bin; Guo, Mtnyi and Li, Jie; *Cowic: A Column-Wise Independent Compression for Log Stream Analysis*; 2015 15th IEEE/ACM International Symposium on Cluster, Cloud and Grid Computing, May 4-7, 2015; Shenzhen, China; available at https://ieeexplore.ieee.org/document/7152468.

Mell, Peter and Harang, Richard E.; *Lightweight Packing of Log Files for Improved Compression in Mobile Tactical Networks*; 2014

(56) References Cited

OTHER PUBLICATIONS

IEEE Military Communications Conference, Oct. 6-8, 2014; Baltimore, MD, USA; available at https://ieeexplore.ieee.org/document/6956758.

Christensen, Robert and Li, Feifei; *Adaptive Log Compression for Massive Log Data*; SIGMOD'13; (ACM978-1-4503-2037-5/13/06); Jun. 22-27, 2013; New York, New York, USA; available at https://www.cs.utah.edu/~lifeifei/papers/compresslog.pdf.

Racz, Balazs and Lukacs, Andras; *High Density Compression of Log Files;* Proceedings of the Data Compression Conference (DCC 2004); 1068-0314/04; Apr. 2004 IEEE; available at https://www.academia.edu/3143402/High_density_compression_of_log_files and https://www.researchgate.net/publication/4065440_High_density_compression_of_log_files.

\* cited by examiner

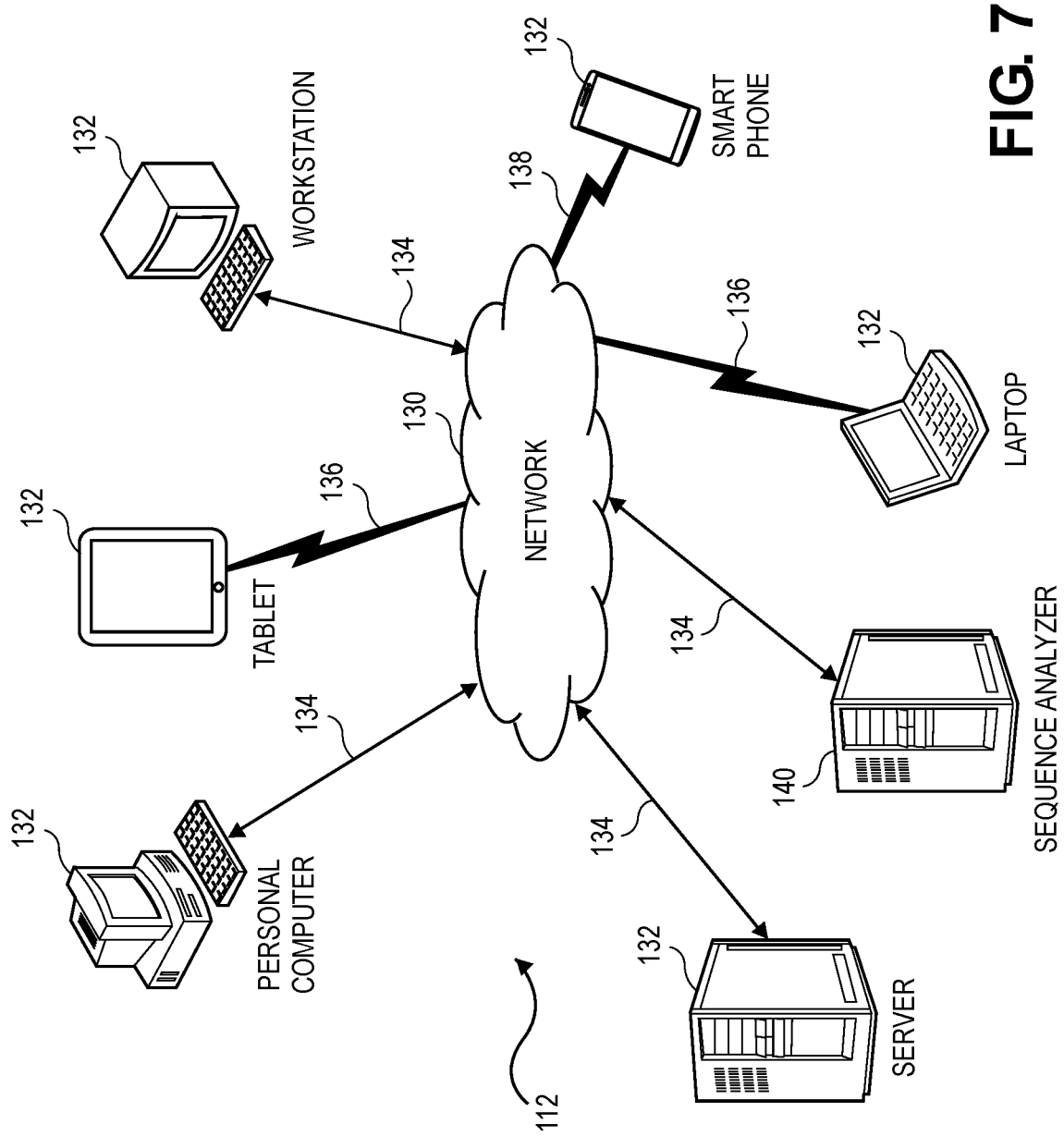

METHODS AND SYSTEMS FOR AUTOMATED PARSING AND IDENTIFICATION OF TEXTUAL DATA

TECHNICAL FIELD

In one aspect, the present disclosure relates to information handling and information security systems; and in particular, to systems and methods for substantially automatically parsing and identifying textural message data generated by varying source systems and/or devices.

BACKGROUND

Increasing the efficiency and effectiveness of system log data analysis has been the focus of substantial research and development, particularly among security analysts attempting to inspect and analyze security log messages for evidence of security incidents, threats, and/or other fault conditions/issues, as well as to diagnose system performance problems and other types of analyses. The faster and more accurately potential data security threats can be detected, the faster remedial actions can be enacted to stop, remediate and/or prevent such threats.

For example, managed security services providers ("MSSP") generally provide real-time monitoring of networks and system infrastructure of their customers, e.g., network hardware and applications, to proactively search for and address potential security threats; and typically log or otherwise accumulate activity data on such networks and infrastructure. A single MSSP may track and log activity for thousands of individual clients, and in doing so, MSSPs may ingest log messages from hundreds of different device types, including hundreds or even thousands of user devices, thereby generating and/or receiving potentially billions of activity logs each day. As these log messages come in, it is necessary that they quickly and efficiently be normalized to a machine understandable format, and analyzed to detect/determine possible security issues. Different clients serviced by a MSSP, however, may format their data or network information in a variety of different ways, e.g., with different syntax, formats, etc., and further may utilize a number of different types of devices running a variety of software programs and/or variations or updates thereof. As a result, though the received log messages may contain substantially the same information, it can be received in a wide ranging variety of language formats, many of which often may not be easily translatable.

Various techniques have historically been used to extract the useful information from system-generated log messages. For example, within the system log analysis field, two approaches that have been used include regular expression based systems and algorithmic methods aimed at automatic parsing. Regular expressions (e.g., regex, Perl-Compatible Regular Expressions, PCRE, etc.) are used in a wide variety of commercially deployed systems, generally utilizing regular-expression libraries, expert systems, and rule engines designed for information extraction for input data. As these systems are predominantly manually crafted and curated (e.g., by human analysts), such systems can be made and adopted to successfully parse data in a wide variety of formats. These solutions have proven functional and capable of handling the volumes seen in log management solutions, but also generally require substantial ongoing human intervention efforts to build and maintain. Advanced parsing algorithms are another topic of on going research and development. These algorithmic parsing techniques generally aim to eliminate the reliance on human curated regular expressions/rules and leverage machine data analysis to parse system log. Most algorithmic parsing techniques can be categorized as one of frequent pattern mining, message clustering, or heuristic based analysis. Each set of such techniques have accuracy and performance trade-offs, including whether they are online (capable of processing streams of individual messages) or offline (requiring a large collection of messages to be analyzed as a batch).

In the field of entity extraction in Natural. Language Processing (NLP), some NLP methods rely on various machine learning techniques to attempt to replace what would otherwise be a complex rules engine that may be impractical to develop and manually maintain. Compared to many regular-expression based systems, NLP systems generally operate in a much more complex domain of highly variable, human created text, and also typically require substantial computing power to process.

Accordingly, it can be seen that a need exists for more efficient ways to parse and identify incoming security log data. The present disclosure addresses these and other related and unrelated problems in the art.

SUMMARY

Briefly described, the present disclosure is, in one aspect, directed to methods and systems for automated parsing and identification of system generated unstructured or partially semi-structured textural output data, such as raw data log messages for enhancing efficiency of review/analysis thereof. Incoming raw log message data is received from a variety of systems and/or devices (including substantially disparate systems and devices). This raw log data is received initially by a parsing system as a stream of bytes. The parsing system includes a scanning component that scans and processes the incoming, stream of bytes, inspecting individual bytes/characters in sequence, and applying a lexing algorithm/engine and/or character sequence models to extract, identify and group similar bytes together into one or more data structures or lexemes delivered in each incoming data stream of bytes. The parsing system also generally includes a segmenting component or tokenizer configured to identify and determine into inter-message or other message segmentation boundaries from the lexemes to further identify and/or extract one or more tokens based on the identified generated lexeme(s). The identified tokens then can be provided as an input to a classifier which evaluates the tokens using a classification algorithm/engine and/or model (or set(s) of algorithms/engines and/or models) configured to recognize and identify message types and/or identifiers. The classifier further will be updated and trained by a continually growing corpus of examples collected through an interactive labeling process involving machine-assisted human analysts.

In one embodiment, each token will be segmented into one of two categories, e.g., a variable data field or static template text string. The tokens can further include a lexeme feature, a character, or combination(s) thereof, which may be generated as a function of how the model classification engine(s) or decides where to put a template token, variable data token, or end of message token boundary(s). Upon identification of the start and end of a new candidate message, template categorized tokens (byte sequences) are developed for use as a message fingerprint, including a fingerprint identifier for input to the classifier component to characterize the overall form of the message. The message fingerprints generated from the tokens are received and analyzed by a fingerprint identifier component of the classifier, which compares the message fingerprints to a collection of previously encountered fingerprints using a classification model to determine the specific type of message (i.e., based upon a selected or desired confidence level or probability match), which includes associated configuration information providing instructions for field name assignments, parsing logic, and data transformations.

Properly identified messages can be stored, such as being added to a dictionary or other repository of known message forms for assisting in future comparison analyses. However, novel or unidentified message forms or messages with a low confidence level of fingerprint matching results produced from the classifier (i.e., the probability or confidence of the message matching a previously identified message type or form, etc. is below a threshold value) can be routed to a machine-assisted labeling system where human data analysts can analyze and mark up the unknown candidate message according to domain or contextual knowledge, which continually improves the classification model and total collection of known message types.

The methods and systems described herein aims to avoid labor-intensive hand-construction of regular expressions or processing rules, while utilizing the ability of a human analyst feedback loop to quickly build collections of message forms while maintaining the ability to online process system log messages at high speed and volume.

Various objects, features and advantages of the present invention will become apparent to those skilled in the art upon a review of the following detail description, when taken in conjunction with the accompanying drawings.

BRIEF DESCRIPTION OF THE FIGURES

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 7 is a schematic diagram of a client/customer networked system of information handling systems for the source system of FIG. 1.

The use of the same reference symbols in different drawings indicates similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
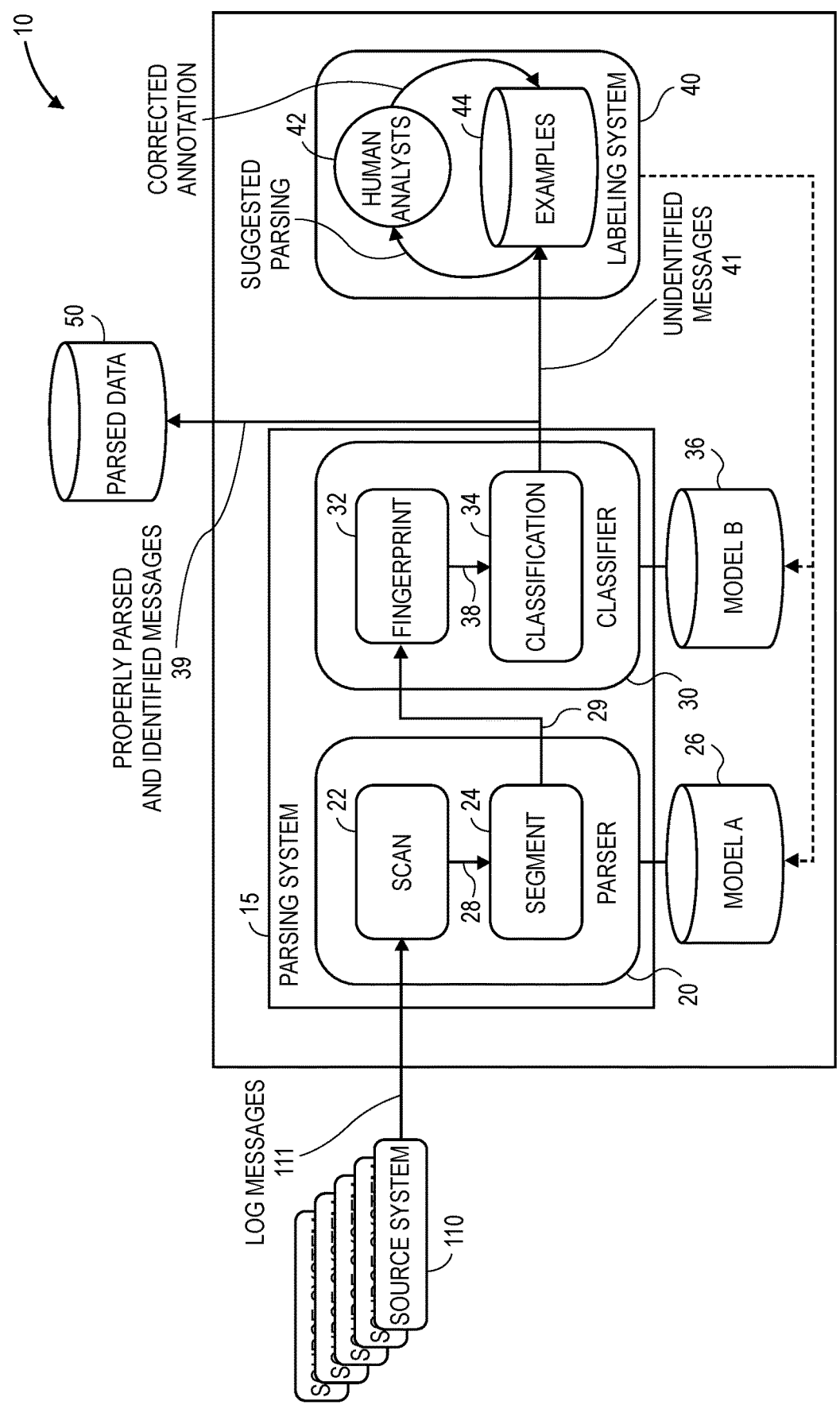
FIG. 1 illustrates a system for automated parsing and identification of textual data according to the present disclosure.

FIG. 1 illustrates a schematic diagram of a system 10 for automated parsing and identification of textual data according to the present disclosure. The system 10 generally employs a multi-stage approach, with a parsing system 15, including a parser 20 and a classifier 30 for receiving and parsing raw incoming textural data, and a labeling system 40. The parser 20 further includes a scanning component (scanner) 22 and a segmentation or tokenizes component 24, and is generally configured to receive the raw data and leverage a machine learning algorithm and/or parser model(s) 26 (i.e., as indicated at "Model A" in FIG. 1) to determine and structure the data into sequences of bytes that are further used to generate tokens 29 based on cross message boundaries and message static template or variable data boundaries.

The classifier 30 receives the output tokens 29 from the parser 20 and includes a fingerprint identification component 32 and classification component 34 configured to analyze and compare the tokens received from the parser 20 against an identification model 36 ("Model B") to identify specific and/or known message formats based upon known and/or recognizable fingerprints or other identifying characteristics of the tokens. The parser and classifier models 26/36 are generated and updated by an integrated labeling system 40 that receives and analyzes messages that are not identified to a desired level of confidence (i.e., messages with formats or of a type that do not match known or previously identified types/formats with a selected or prescribed threshold confidence level or probability). The labeling system 40 facilitates continuous learning by utilizing input 42 from human analysts' review of unidentified messages to update the models. The labeling system 40 further is configured to provide corrected or annotated messages and identification information as examples that can be used for training analysts and/or the Models 26/36, e.g. to help generate suggested identification and/or further pairing information for analysis of future unidentified messages. These examples can be collected/stored in a data store 44 as indicated in FIG. 1.

Figure 6:
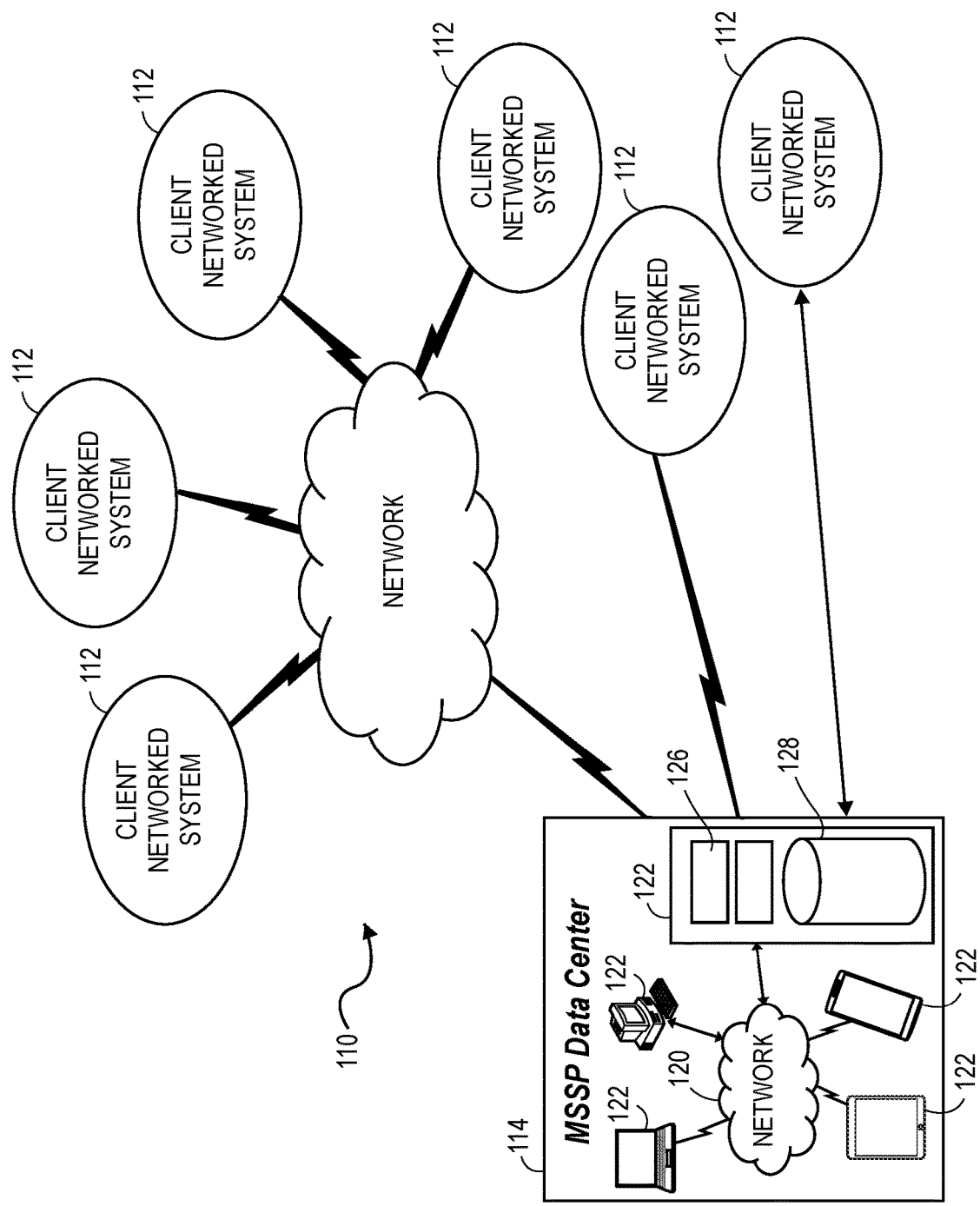
FIG. 6 is a schematic diagram of a source system according to one example of the present disclosure.

In one embodiment, as shown in FIG. 1, the system 10 is configured to process and receive textual outputs, such as security logs, from a plurality of source systems 110, in the form of raw data, as a sequence of bytes. Such source systems can include a variety of networks and/or sources/devices that generate data such as security logs in a variety of formats and/or languages, including substantially disparate formats/languages. Example source systems 110 are generally illustrated in FIGS. 6-7 and are described in author detail below including various client network systems and/or devices. The system 10 is configured to thus receive incoming raw data and process/break down such raw data to a basic form—a stream of bytes as a base or root language for analysis. As a further result, the labeling and learning system 40 thus will benefit from the receipt and analysis of substantially larger sets of data generated from a plurality of source systems 110 regardless of log message origin, format, language, sensitivity level, or final destination.

In one embodiment as indicated in FIG. 1, various source system(s) 110 in communication with the system 10 each will send textural outputs, such as log messages 111 (e.g. security logs) to the system 10. The incoming log messages 111 are presented as a stream of bytes 21 to the parser 20 for initially processing bytes of each stream of bytes 21 in the order they are received (FIG. 1), and with the received bytes generally including human readable text. The scanning component (scanner) 22 of the parser 20 is configured to inspect the individual raw bytes of each incoming string in sequence and convert the raw characters/bytes into a simplified sequence or group of bytes organized into one or more targeted or focused data structures (referred to herein as lexemes 28). The lexemes developed by the seamier generally will include groupings or collections of raw characters bytes from an incoming string that are paired with a designation of a type of such characters/bytes as well as any additional characteristics used by subsequent steps below. For example, punctuation, such as a comma, i.e., ",", will have one character with one character type—the punctuation type, i.e., a comma. The strings can have varying numbers of characters, e.g., a string, "200" has three characters each with the same character type (i.e., a number), while a different string "2,000" has five characters, four characters being of the same type, i.e., a number, and the other character being a different character type, i.e., a comma; which differing characters can be used to generate multiple lexemes, with, for example, punctuation and/or other features, such as upper case or lower case letters, denoting the start of separate lexemes. Depending on the configuration of the follow-on segment component 24, the scanning algorithm/engine or character modeling can return only individual characters as a lexeme, though the scanning algorithm or character modeling also can be more complex, involving heuristic based analysis grouping similar bytes together into a lexeme.

Figure 2:
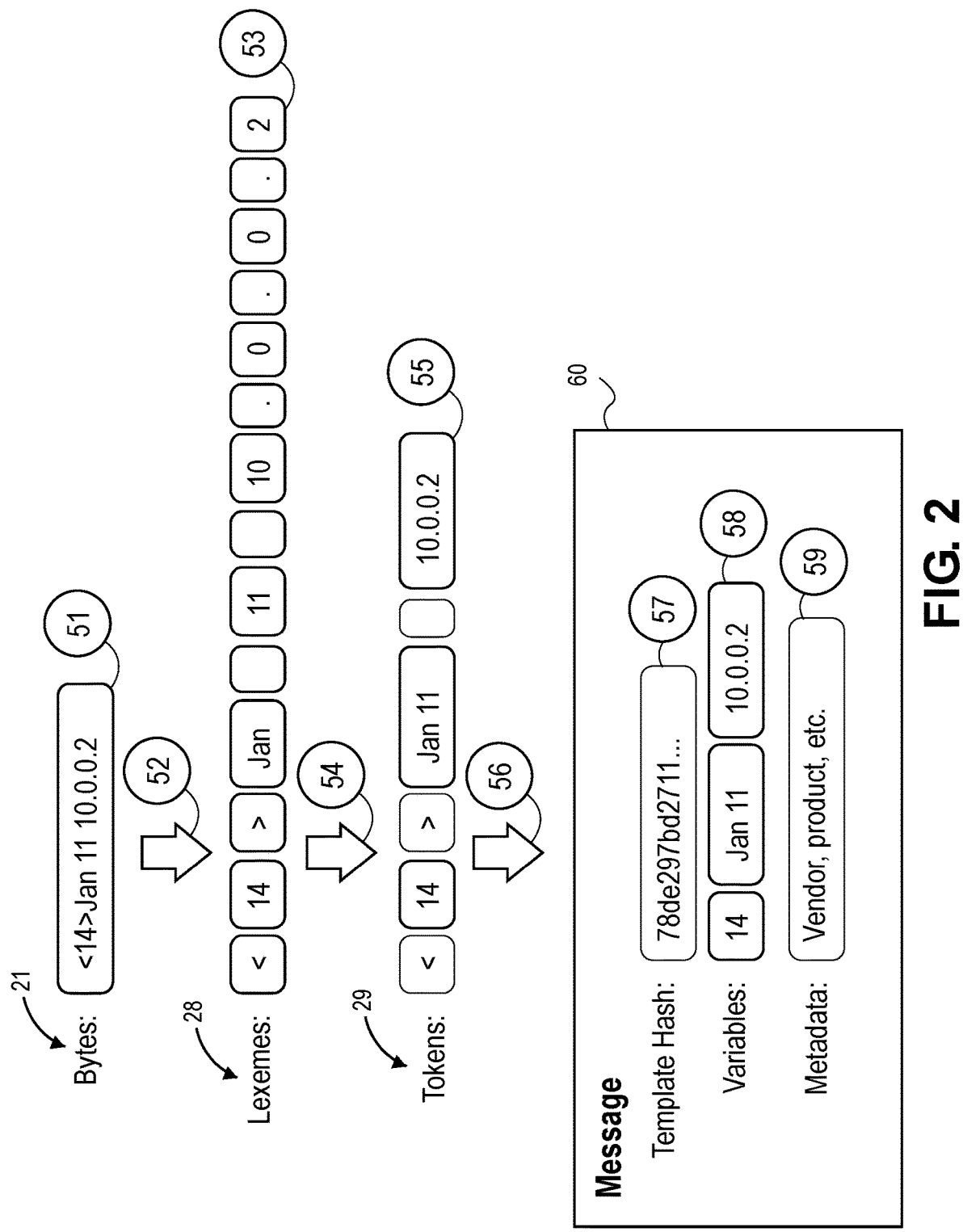
FIG. 2 provides a schematic diagram illustrating the processing of incoming textural data received as a sequence bytes by the system of FIG. 1.

FIG. 2 provides a schematic diagram illustrating the processing the sequence of raw characters/bytes received by the parsing system 15. As indicated in FIG. 2 at 50, the present disclosure assumes and operates on a string or sequence of bytes 51 representing one or more messages generated by a source system 110, and encoded in a text-based format. The system 10 generally is designed to process system-generated textual outputs, such as that commonly found in log files (e.g. web server logs, intrusion detection system logs, operating system logs, etc.), though the system 10 can process other textual data or other information, without departing from the scope of the present disclosure. Those skilled in the art further will recognize that any number of implementation modalities such as files, network connections, and other protocols may be represented using such a byte sequence abstraction without departing from the scope of the present disclosure.

At 52 in FIG. 2, as a first step, the raw bytes are received and processed into one or more simplified character sequences of data structures (e.g., via the scanner 22). This processing step facilitates a more accurate identification of the pertinent/selected information, by generating a smaller set of distinguishing features to eliminate noise or extraneous information and focus on key selected information elements within the log (i.e., was a website visited, data/time of access, etc. . . . ) simplify review for better management and performance. The data structures the lexemes 28 in FIG. 2) created by the scanner 22 generally will include groups of characters/distinguishing features for the incoming raw data strings—i.e. collections of selected or particular features of the data necessary for analysis. By way of example, FIG. 2 illustrates, at step 53, the generation of lexemes 28 including a date as a distinguishing characteristic.

Figure 3:
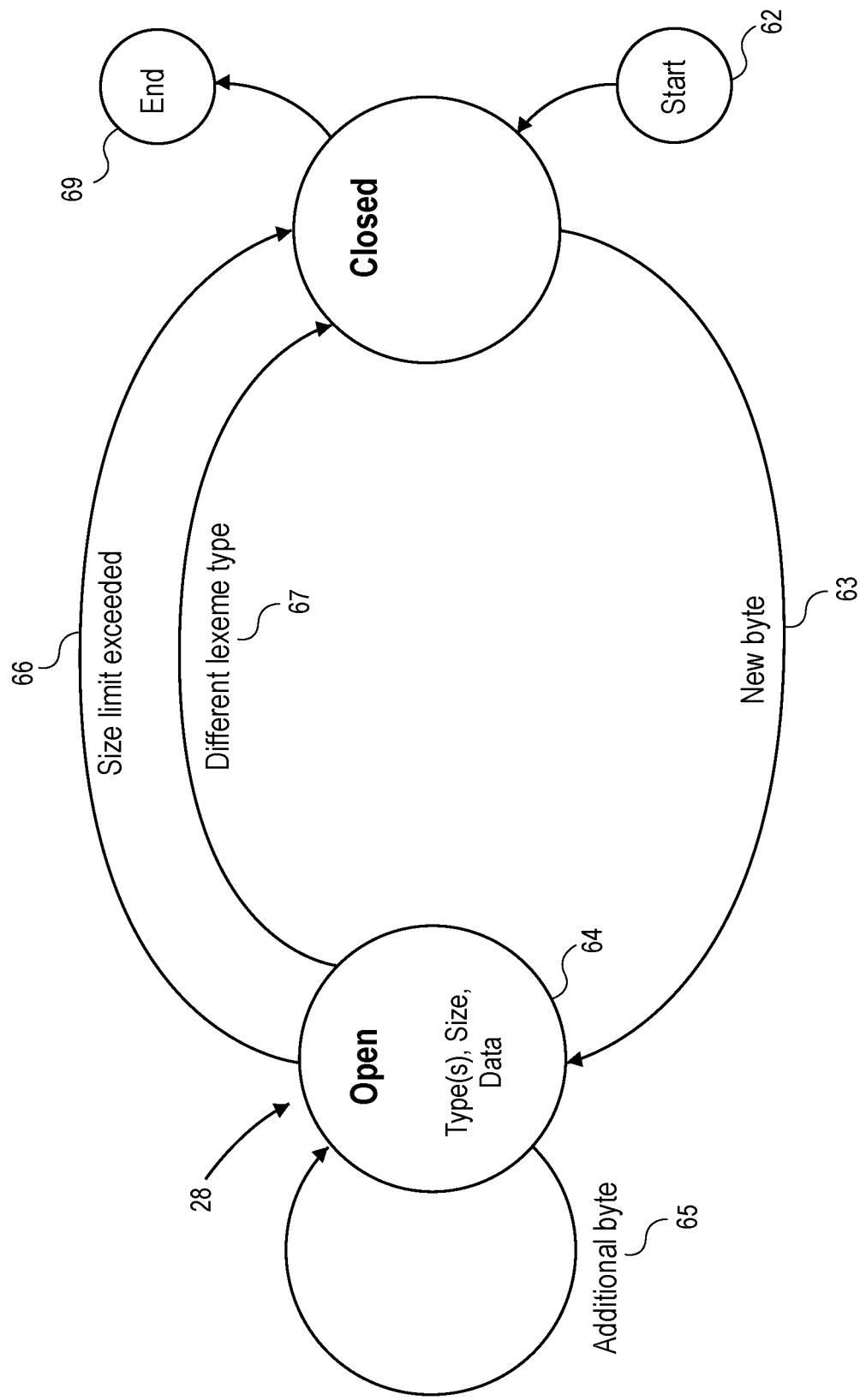
FIG. 3 provides a representation of the lexeme state modeling and transitions according to one aspect of the present disclosure.

FIG. 3 provides a schematic diagram providing a representation of lexeme state modeling and transitions compiled by the scanner 22. The scanner 22 transforms the sequence of raw data bytes into a sequence of lexemes. The implementation of this generally will comprise a state machine which accumulates bytes with related type(s) and forms new lexemes based on a rule mapping or dictionary.

As indicated in FIG. 3, the scanning component 22 of the parser 20 processes each new byte 62 of the incoming data string ono byte at a time. In an open state 64, the new byte is processed to determine if the byte meets rules for identification of a known/generated lexeme 28. If none of the rules are met, additional bytes are added until one of the rules is mot. Using the data example shown in FIG. 2, for a date of Jan. 13, 2019, the scanning component lexing model/state machine will need to determine if the characters should be grouped as one lexeme or if they constitute multiple lexemes. The scanning component can apply decision rules, such as determining if the new byte or new byte in combination with additional bytes exceeds a size limit, such as indicated at 66 or whether the byte/additional bytes are part of a lexeme that fits a recognized pattern, and if so, can add the byte to the current lexeme as indicated at 63, or whether it is of a different type at 67, and if so, the parser 20 moves the lexeme to a closed state indicated at 68. The process repeats and will end at 69 after all of the bytes are processed for identification of the one or more lexemes.

In one embodiment, the scanner 22 produces lexemes according to a series of prescribed or selected rules applicable to the raw data of the incoming logs, with each rule defining a lexeme "Type", which can include a maximum size—i.e. a MAX_LEXEME_LEN that defines a maximum desired lexeme length. For example, a punctuation character (e.g., which has a 1 byte maximum size) may become individual lexemes and are labeled with their corresponding punctuation mark as their type. Newline and tab characters (which can have a 1 byte maximum size) may become individual lexemes, and are labeled with an indication of their type. Repeating sequences of space characters (up to MAX_LEXEME_LEN) will be combined into a single lexeme, with a corresponding type. Control characters with 1 byte maximum size (e.g., Ascii 0-31 and 127 but not newline or tab) become individual lexemes, and are labeled as the control character type. All other bytes are considered varchar, and have repeating sequences of those bytes combined into a single lexeme. Instead of a single type representation, Varchar lexemes collect the unique character classes that are represented in the overall lexeme. The character class for each byte can include one of: (i) Uppercase (Ascii 65-90 inclusive); (ii) Lowercase (Ascii 97-122 inclusive); (iii) Digit (Ascii 48-57 inclusive); and (iv) Unicode (Ascii 128-255 inclusive). The lexeme accumulates all of the unique character classes that have been identified in the lexeme, and thus varchars must contain between one and four types.

It will be further understood that multi-byte unicode character encodings typically use the upper ascii range to represent multi-byte characters. The lexer does not attempt to infer a specific encoding at this step, rather recognizes that upper ascii bytes exist. Encoding decisions are performed by subsequent processing steps.

According to this disclosure, one skilled in the art will recognize that minor variations in these rules will not meaningfully affect the functioning of the system or the core algorithm, and further that alternative, suitable rules can be employed without departing from the scope of the present disclosure.

The scanning component 22 of the parser 20 (FIG. 1) will produce a sequence of lexemes 28, which lexemes will contain various selected or key identifying attributes of incoming logs/message data, that can include, but are not limited to: at least one, and up to four or more types (e.g., as assigned by the ruleset implemented by the scanner described above); a number of bytes from the original byte stream (at least one, and up to MAX_LEXEME_LEN) contained in the lexeme; and the actual bytes from Byte Stream 1 can be collected by the scanner as well as other suitable attributes.

In addition, embodiments of the present disclosure may optimize the implementation of lexemes and attributes without departing from the scope of the present disclosure. For instance, the original bytes from Byte Sequence 1 could be copied into a lexeme structure, or, in an alternate embodiment, the original Bytes from Byte Sequence 1 could be referenced (i.e. "pointer") via offset and size.

As further indicated in FIG. 1, the lexeme(s) 28 are provided to/received by the segment component 24, indicated at step 54 in FIG. 2, and processing within the parser continues by trying to properly segment the scanned message lexemes (e.g. data sequences 28) in context. The scanned message lexemes will be segmented and/or clustered into one or more tokens 29 by the parser 20. The segmentation component 24 is configured to identify and/or extract the one or more tokens 29 based on the received lexeme 28, e.g., by determining segmentation boundaries 55, such as inter-message boundaries (a common challenge with syslog stream(s)), and/or intra-message boundaries of static template strings from dynamic variable strings, as indicated in FIG. 2. Each token is classified into one of two categories, e.g., template data or variable data. Template data generally is defined as the repetitive, low cardinality data, such as punctuation, whitespace, etc., that is part of the structure of the overall message. Variable data generally is considered to include higher cardinality data (e.g., user information, dates, interne protocol addresses, domains, etc.) that varies from message to message.

The tokens 29 can be determined by applying a machine learning model or algorithm (e.g., model 26) to the lexemes 28. For example, the machine learning model or algorithm can examine the size, number of bytes, type, etc. of the lexemes to determine segmentation boundaries thereof for generation of the tokens 55. The tokens 55 then are processed and segmented into structured messages with values, identifiers, features, attributes, etc. The sequence of Tokens will be combined and categorized, as either a TEMPLATE or VARIABLE type.

As indicated at 56 in FIG. 2, the categorization of the tokens relies on the fact that the template data is suited to the task of clustering message types, and can activate template bytes into a single bite array, and performs a look-up against a dictionary of all templates. If the template is found in the dictionary, the dictionary lookup is successful, the message object 60 is generated. The message object includes a parsed and normalized representation of the source text. The object message can include a hash or the template 57, the variable 58, as well as metadata 59.

In one embodiment, the parser 20 (FIG. 1) uses the lexeme(s) 28, and surrounding context of other lexemes, as features inputs for evaluation using a machine learning algorithm or model 26 to determine the segmentation boundaries. Depending on the scanned lexeme output 28 various techniques can be leveraged for the machine learning algorithm or model 26 ("Model A"), which is trained from the collection of labeled message examples 44. For example, sequence of lexemes, and their local context, can be analyzed iteratively one lexeme at a time—interrogating the machine learning algorithm and model 26 for its decision on whether a new segmentation boundary is found at that location. Alternatively, Natural Language Processing sequence-to-sequence models could be leveraged, such as Conditional Random Fields (CRFs), Bidirectional LSTM Neural Networks (BiLSTM), or even combinations of the two such as Layered-BiLSTM-CRF models used for named entity recognition. However, any suitable supervised learning models or algorithms can be used without departing from the scope of the present disclosure. The token outputs 29 of the parser 20 will include the log message with proper segment tags (e.g., message boundary, template data, or variable data).

Figure 4:
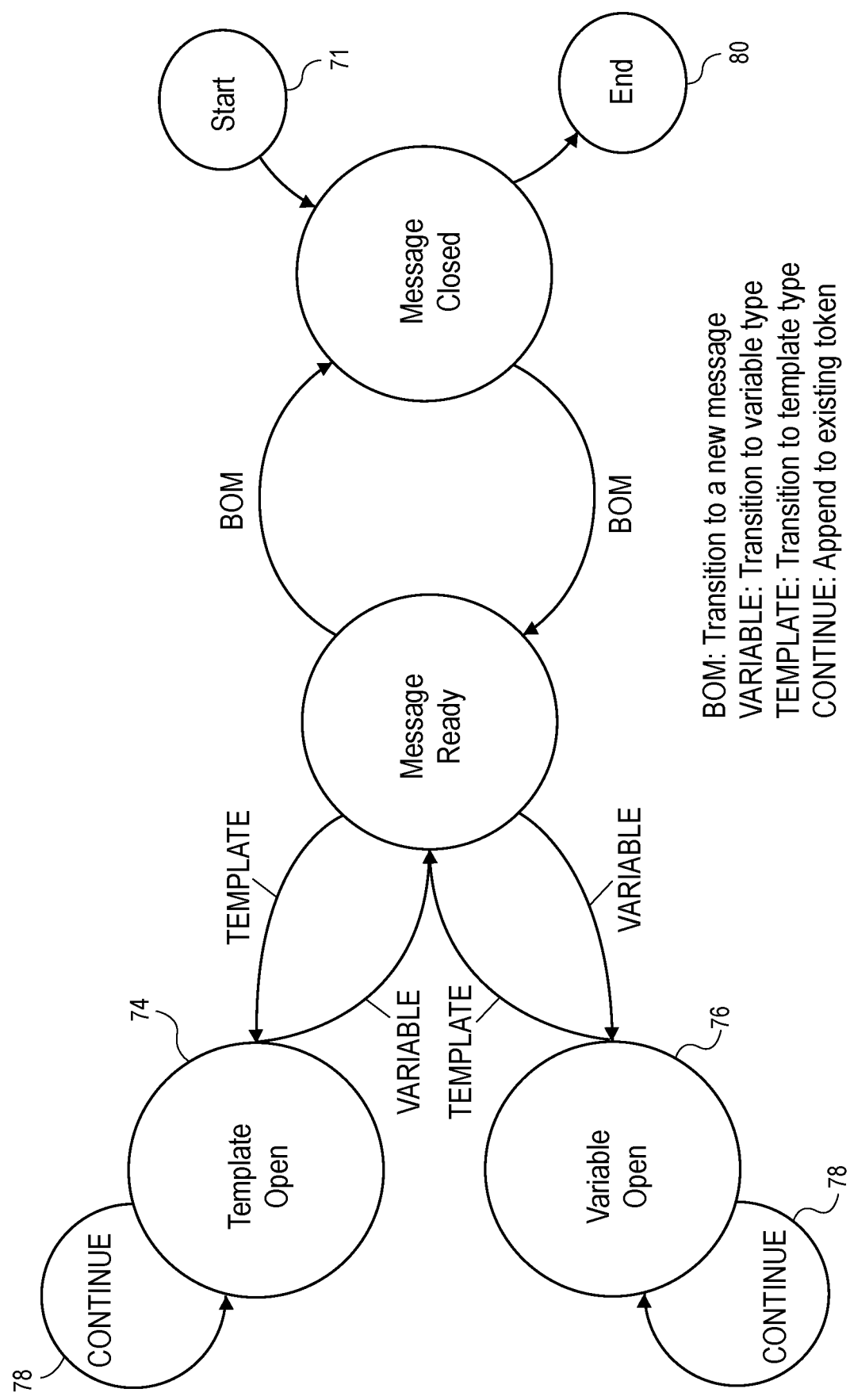
FIG. 4 illustrates a tokenizes state do termination/operation according to one aspect of the present disclosure.

FIG. 4 illustrates a schematic showing a process of tokenization by the parser 20 according to one aspect of the present disclosure. As shown in FIG. 4, in one example, the parser 20 can implement a state machine that collects lexemes into one of two possible states—template or variable. Furthermore, the following possible state transition decisions are possible, for example: Continue, Template, Variable, Beginning of Message. In order to decide whether a transition is necessary, the lexeme is first processed to produce a data structure. For example, the lexeme is processed based on type, size, prefix size, suffix size, content, etc.

In the template state at 74, the state is changed to begin collecting lexemes are collected and appended to a new template token. In the variable state, the state is changed to begin collecting data into a new variable token. In the continue state at 78, current state is not changed, processing is continued with subsequent lexemes as part of a current token.

Once the variable or template tokens are identified, the process will return to the beginning of the message state, and there is a transition to a new message (meaning the previous message is now complete).

After all of the lexeme are processed into tokens the process will end at 80.

The character representation of the lexeme type is produced from the scanner 20 described above. The overall size of the lexeme has a max of MAX_LEXEME_LEN and min of 1. The total size of the LEXEME_PREFIX_COUNT lexemes preceding this one. The total size of the LEXEME_SUFFIX_COUNT lexemes following this one. The lexeme types for the prefix, current byte, and suffix, further are placed into a single list data structure.

Some further definitions and parameters may include, but are not limited to: MAX_LEXEME_LEN: The maximum number of bytes that can be stored in a single lexeme (i.e. 32); LEXEME_TYPE_COUNT: The number of lexeme types the lever can possibly produce; LEXEME_PREFIX_COUNT: The number of lexemes preceding the current one when building the lexeme context (i.e. 24); LEXEME_SUFFIX_COUNT: The number of lexemes following the current one when building the lexeme context (i.e. 24).

This combination of characteristics contextually identifies a lexeme, including information about what comes before and after it (e.g., lookahead and lookbehind).

For processing by the neural network, e.g., with character or machine learning model 26, the above characteristics are then translated into an array of values designed for consumption by the model 26, using a plurality of aspects, such as size, prefix size, context, etc. (where LEXEME_TYPE_COUNT is the total number of lexeme types configured by the parsing system). For example, the size can be normalized into a value between 0.0-1.0 by dividing the value by MAX_LEXEME_LEN. The prefix size can be normalized into a value between 0.0-1.0 by dividing the value by LEXEME_PREFIX_COUNT multiplied by MAX_LEXEME_LEN). The suffix size can be normalized into a value between 0.0-1.0 by dividing the value by (LEXEME_SUFFIX_COUNT multiplied by MAX_LEXEME_LEN). Further, for context, an array of size (e.g., LEXEME_PREFIX_COUNT+LEXEME_SUFFIX_COUNT+1)*LEXEME_TYPE_COUNT) with all values defaulted to 0.0. For each Context position, the types of the lexeme in that position can have a number used to populate the corresponding position with 1.0. This representation is commonly referred to as a multi-hot encoding, and is frequently used to represent categorical data in machine learning algorithms.

The model then evaluates that array of values against a trained model and produces an array of values, e.g., 5 float 32 values, with a position for each possible state transition defined above. The state transition with the highest probability then is selected and returned.

It will be recognized that the above embodiment of a set of machine learning features may be changed in numerous ways without meaningful impact to the overall approach. In addition to the model described above, there are many other sequence labeling models (such as Conditional Random Fields and Long Short-Term Memory models) that are able to map a sequence of bytes to a sequence of VARIABLE/TEMPLATE tokens; the model choice depends primarily on required performance levels (both accuracy and execution speed) in the deployment environment, and that choice should be made based on performance on data sampled from that environment.

When the message is complete, the parser 20 will have properly combined (and categorized) a sequence of tokens, each of which will be either a template or variable type. Concentrating a series of tokens that fit within a particular template type or form will create a unique identifier for the message that will be submitted to the classifier, as indicated in FIG. 1.

The classifier 30, after a proper inter-message boundary is determined from the parser 20 (FIG. 1), attempts to identify the specific message type 60 (FIG. 2). In particular, the fingerprint component 32 (FIG. 1) of the classifier 30 receives the token output 29 and identifies unique fingerprint identifiers. For example, the parsed/concentrated static template tokens are used as a unique fingerprint identifier 38 for each saved message example type sourced from the labeling system 40. In one embodiment, the fingerprint identifier 38 can be a one-way hash (indicated at 57 in FIG. 2) of the concatenation of all template bytes in the order that they appear in the message.

As shown in FIG. 1, the fingerprint identifier 38 is provided as an output and received by the classification component 34. The classification component 34 is configured to check fingerprint identifier against a classification model 36 ("Model B"). Typically, model 36 employs a straightforward dictionary lookup, which contains the message type and additional instructions for subsequent processing activities, such as, field transformation, normalization, etc. Properly parsed and identified messages can be provided to a parsed data store 50. For example, common devices/software log generating products (i.e., Apple® devices, a Cisco® firewall, ...) generally produce substantially similar message templates for which rules can be crated to enable the substantially automatic determination of the type of product generating the message.

As FIG. 1 indicates, if the fingerprint identifier of a message is missing from model 36 or the classification model 36 returns low-probability segmentation predictions (indicating a lack of confidence in the predicted state transition), the unidentified/unparsed message 41 is sent to the labeling system 40 for review by human analysts (users). The analysts can label or parse the unidentified/unparsed messages and/or can obtain or identify new data points for labeling or parsing thereof. These manually labeled transitions can become new examples for retraining an updating of the machine learning model 26 for parsing, and the new message fingerprint updates the deployed classification model 26. The updated models are made available to the parsing and identification components 20/30 such that subsequent raw log bytes are processed using the updated models. In some embodiments, the model 36 can employ an active learning algorithm that can actively query the analysts for designed outputs or additional data points for parsing/labeling.

Figure 5:
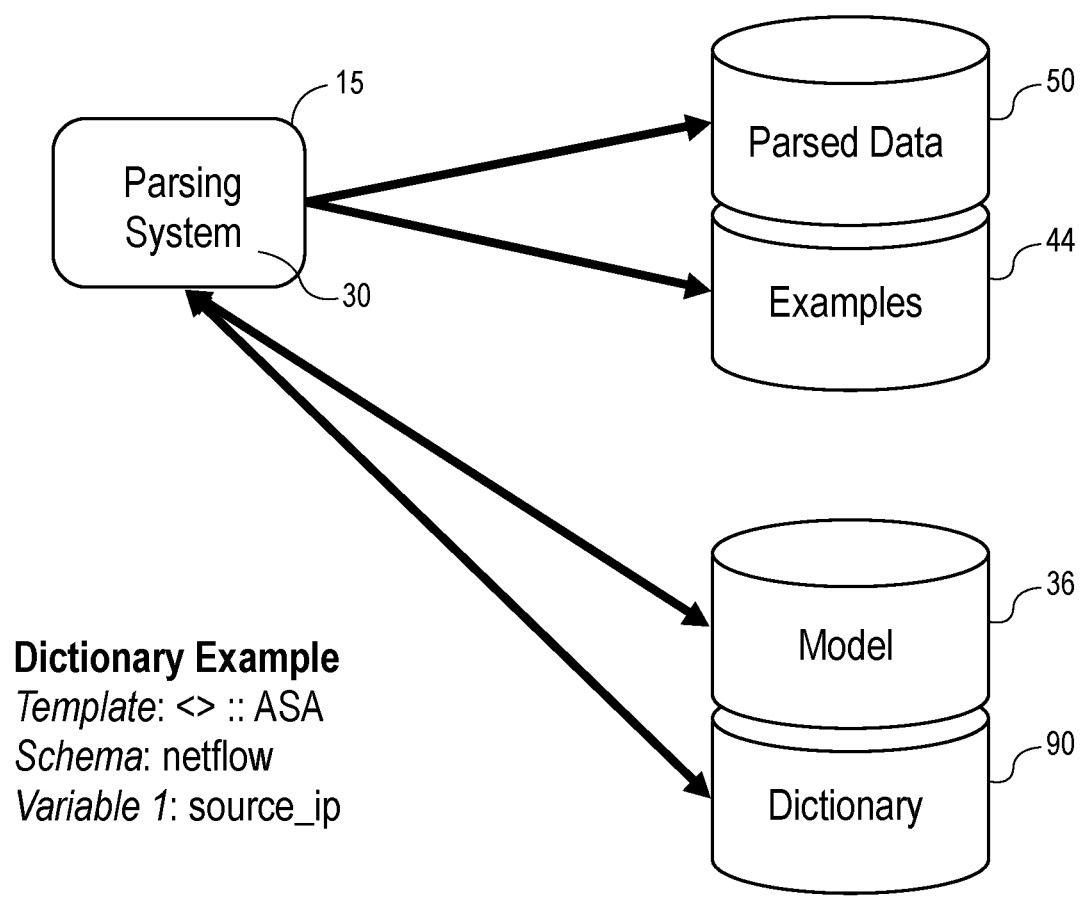
FIG. 5 illustrates a process flow diagram for classification according to the present disclosure.

FIG. 5 is a diagram illustrating a process for classification according one example of the present disclosure. As shown in FIG. 5, the parsing system 15 (e.g., via the classifier component 30) provides the tokenized messages or message objects to the classification model 36 for identification or classification thereof. The model 36 includes a machine learning neural network that cross-references/compares the received tokenized messages/message objects against a dictionary 90 including known message identifiers or objects for classification and/or identification of the tokenized messages. Thereafter, as further shown in FIG. 5, for identified messages (either based upon a match to a message identifier within the dictionary or which the classification model 36 determines to be a match to a known message type/form with a high confidence level) that can be parsed are provided to the parsed data store 50. Unidentified messages, e.g., messages that cannot be matched to the dictionary and classified/matched by the model within a prescribed degree of accuracy or threshold confidence level, are provided to the labeling system 40 (FIG. 1), being received by the example store 44 for further, subsequent processing by the labeling system 40 (such as by human analytics as shown at 42 in FIG. 1).

In one embodiment, the classification algorithm/engine of the classification model 36 generally relies on the fact that the message templates are suited to the task of clustering message types. For example, all message template bytes being concatenated into a single byte array. The message templates are used to perform a look-up against the dictionary 90, as shown in FIG. 5.

The dictionary 90 includes a repository of the message templates supported by the platform. The classification model 36 and the dictionary 90 further can include concatenated bytes of the known message templates for use as look-up keys with corresponding identifiers for various known messages. The dictionary 90 also contains configuration data for the classification model 36 regarding how to correctly assign metadata to the message(s) and further will include normalization and processing instructions, for example, for product, queue, schema, variable mapping, etc. The type of device or product vendor that sends these messages also can be determined by such identifiers based on template information/bytes that are known to be commonly generated by such products—i.e. log messages generated by Cisco® Firewall products use certain common identifying characteristics that can be stored and used by the dictionary to readily identify incoming messages. For queueing, data may be prioritized or ignored via queue routing logic. For schema, individual messages can be mapped to a target schema which triggers further analysis. For variable mapping, the attribute names and types may be assigned, as appropriate, for each variable in the message.

Persons skilled in the art will recognize that a substantial variety of additional processing may be performed based on the successful classification of the message. This disclosure represents the process and concept of uniquely identifying the message, and the classes of actions that may then be taken. The embodiment described above should not be considered representative of the types of actions that are possible, and is not exhaustive. Additional actions that may be appropriate and attached to a given message also can be taken. For example, all messages with a specific ID can be discarded because they are not pertinent to downstream processing and are costly to capture and store. Messages can be prioritized and more important ones can be provided to different, e.g., prioritized, processing paths. Certain classes of messages can be summarized and the count/summary can be provided instead of the entire message. The template bytes further may be hashed using a cryptographically secure hashing algorithm. Using a one-way hash as the lookup key for the dictionary allows dictionaries to be broadly shared without risk of sensitive data included in a dictionary template being disclosed.

In one embodiment, the classification model 36 generally will include a machine learning neural network that receives the messages from the parsing system 15, as well as the templates and other data, e.g., configuration data, etc., from the dictionary 90 as inputs thereto for identification and classification of the messages, e.g., assigning metadata, normalization, processing of product, queue schema, variable mapping, etc. (FIGS. 1 and 5). Messages that can be identified or classified by the classification model 36, e.g., messages that can be correctly identified or classified within a prescribed probability threshold or level of confidence, are provided to the parsed data store 50. These identified messages also can be provided as additional templates in the dictionary 90 or in some embodiments as examples 44, e.g., for training of or for further iterations of the machine learning classification model 36. That is, correctly identified messages (including ones with slight variations or differences in language/type/format) can be used to update the dictionary, for confirmation of decisions made by the classification model, and/or further refinement of the accuracy of the machine learning neural network classification model 36. Though the classification model 36 is described herein as a machine learning neural network, other suitable machine learning models or algorithms can be employed, without departing from the scope of the present disclosure.

In some embodiments, assuming the dictionary lookup is successful and parsing and processing is completed successfully by the classification model 36, the resulting message object will contain a parsed and normalized representation of the source text, including but not limited to: template (e.g., the message template bytes, concatenated into a single stream); schema (e.g., the schema to which this message should be normalized); and variables (e.g., each of the variables, with labels and types assigned based on the processing depicted above). The resulting parsed data then is written into the data store 50 for subsequent review/consumption by automated or manual analysis and query, as generally shown in FIG. 5.

In the event that the dictionary lookup fails, e.g., at least one of the machine learning predictions has a probability below a pre-determined or desired level, which can indicate that the model is uncertain of the appropriate state transition, the raw byte data will be provided to the labeling system, for example, being submitted or written into the examples data store 44, as shown in FIG. 5. This raw byte data input to the examples data store 44 is used for subsequent consumption and analysis by the labeling system 40 as described below (FIG. 1). These are considered examples of messages for which additional human inspection is desirable to better train the model 36 and dictionary 90 rulesets.

The labeling system 40 (FIG. 1) is designed to allow analysts to interact with and label lexemes and messages in order to improve the accuracy of both the model 36 and dictionary 90.

The labeling system 40 further allows for various functions to be performed. For example, the labeling system 40 facilitates inspection of examples provided by the parsing system 15 for which the existing model and dictionary was insufficiently accurate to be relied upon. The labeling system 40 allows analysts to correctly label lexemes with their desired transition states as defined above, and record choices in an underlying data store 44. The labeling system provides a mechanism for the classification model 36 to be trained and tested against the training data recorded, including demonstration of results. Furthermore, the labeling system 40 identifies templates and can be extracted and stored into the template dictionary 90; analysts can configure each template in the dictionary 90 with appropriately exposed configuration elements as depicted above; and a mechanism can be provided through which instances of the parser 20 of the parsing system 15 may be notified of changes to model and dictionary.

The parsing system 15 and labeling system 40 together allow for iterative improvement and reinforcement of the machine learning models 26/36 and dictionaries 90 based on analyst supervision.

FIG. 6 shows a block diagram of a set of source systems 110 through which log messages 111 are provided to the system 10, which can include, for example, a series of various networked systems 112 managed by the customers/clients. As shown in FIG. 6, the client/customer networked 112 can be in communication with an event management center 113 including one or more data management centers 114 managed by an MSSP. The networked systems 112 can communicate with the data center 114 through a network 116, such as a public or private network, e.g., a local area network, though client/customer information handling systems 112 can be in communication with the data center 114 through other suitable lines of communication 118, such as peer to peer file sharing systems, or other suitable wireless, virtual, and/or wired connections. The data center 114 can include one or more internal networks 120 with a plurality of information handling systems 122, such as servers, personal computers, laptops, tablets, workstations, smart phones, personal data assistants, etc., connected thereto. In one embodiment, the information handling systems 122 can include processor 126 and a memory or other suitable storage mediums 128. The memory 128 can include a random access memory (RAM), read only memory (ROM), and/or other non-transitory computer readable mediums.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system also may include one or more buses operable to transmit communications between the various hardware components.

FIG. 7 is a block diagram of client/customer networked systems 112. The systems 112 can include a network 130, which may include the internet or another wide area network, a local area network, or a combination thereof. The network 130 may provide data communications among a series of information handling systems 132, which can include workstations, personal computers, smart cellular telephones, a personal digital assistants, laptop computers, servers, and other suitable devices. The information handling systems 132 can be coupled to the network 130 through wireline connections 134, wireless connections 136, cellular connections 138, or other suitable lines of communication. In some aspects, the information handling systems 132 of the networked systems 112 generally can be configured for a specific user or a specific use, such as financial transaction processing, airline reservations, enterprise data storage, or global communications, etc.

As shown in FIG. 7, client/customer networked systems 112 further may include one or more monitoring devices 140 communicatively coupled to the network 130, for example, through a wired connection 134, though or other suitable connections, such as a wireless connection, also can be used. The monitoring devices 140 may include a server or sequence analyzer or other client suitable computing device that has a processor 142 and a memory 144 or other suitable storage. The memory 144 can include a random access memory (RAM), read only memory (ROM), and/or other non-transitory computer readable medium. The monitoring devices 40 further typically will be operable to store and execute computer readable instructions to continuously monitor, in real-time, activity at each networked system 112, for example, activity of the information handling systems 132 connected to network 130. Such monitored activity can include, by way of example, logging on and off of the networks by the information handling systems 132, downloads or uploads, changes to settings, etc. Additionally, network activities such as executed processes (i.e., type, number of times accessed, resulting actions, etc.), types and/or numbers of files modified, net flow aggregate, and other, similar activities also can be monitored and collected as part of security log data/records.

The monitoring devices 140 in each client/customer networked system 112 additionally can be configured to aggregate or ingest a plurality of log messages or other suitable records, based at least in part on monitored activity of the plurality of devices 118 and the client's networks or systems. The plurality of logs messages may be stored in the memory or storage 144 of the monitoring devices 140 and can be communicated to and/or accessed by the MSSP providing security services for the clients. For example, each monitoring system 140 may automatically send the log messages to the system 10, e.g., which can be part of one or more servers at the MSSP data center, or the system 10 can otherwise directly access the logs messages from the storage of the monitoring devices. It should be recognized, however, that providing monitoring devices 140 at the client/customer networked systems 112 alternatively can be optional, such that clients/customers can independently monitor their own networked systems, for example, using one or more of the information handling devices 132, and otherwise provide log messages to the system 10.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A security system for a network, comprising:
an event management center comprising:
    a parser including at least one processor having programming configured to:
        receive a plurality of log messages including security log, data from a plurality of sources in a raw data forum as a stream of bytes;
        scan the stream of bytes;
        identify and extract selected character features from the raw data and organize the extracted character features into one or more data structures;
        identify message boundary features within the data structures and generate one or more tokens; and
        categorize the tokens into categories, including a variable data token and a template token; and
    a classifier including programming configured to:
        develop at least one message fingerprint identifier from the template tokens;
        compare the at least one message fingerprint identifier to a collection of message fingerprints and determine a probability the at least one message fingerprint identifier matches one or more previously encountered fingerprints; and
        if the determined probability is below a predetermined threshold probability, or confidence level, transfer the log message to a labeling system for determination of a configuration of the log message.

2. The system of claim 1, wherein the classifier includes a machine learning neural network.

3. The system of claim 1, wherein the event management center comprises a data center of a managed security service provider.

4. The system of claim 1, wherein the event management center comprises a network server.

5. The system of claim 1, wherein the labeling system submits the log messages received thereby to analysis by one or more human analysts to analyze the message and generate a new message fingerprint.

6. The system of claim 5, further comprising a series of example message fingerprints generated by the labeling system and used to train and update the one or more models of the parsing system and classifier.

7. The system of claim 1, wherein the parsing system and classifier each comprise one or more engines including programing to perform probabilistic modeling to determine whether selected attributes, features, commonalities, and/or sequences thereof are indicative of one or more of the identifiable entities of the security logs.

8. A method of parsing and identifying security log data, comprising:

receiving each of a series of system generated raw security log messages including unstructured and/or semi-structured data from a plurality of source systems as a stream of bytes;

scanning each stream of bytes to identify and extract selected character features thereof;

organizing the extracted character features into one or more lexemes based upon a common attribute of the extracted character features;

generating tokens from the lexemes and categorizing the tokens as at least one of a variable data token or a template token;

concentrating a series of tokens that fit a selected template to create a fingerprint identifier for each message;

comparing the at least one message fingerprint identifier to a collection of message fingerprints and determine a probability the at least one message fingerprint identifier matches one or more previously encountered fingerprints; and if the determined probability is below a predetermined threshold probability, or confidence level, transfer the log message to a labeling system for determination of a configuration of the log message.

9. The method of claim 8, further comprising generating example message data for training one or more of a parsing model and a classification model.

10. The method of claim 9, further comprising updating example message data with security log data processed by the parsing model or the classification model.

* * * * *